(12) United States Patent
Domokos et al.

(10) Patent No.: US 7,648,939 B2
(45) Date of Patent: Jan. 19, 2010

(54) HYDROCRACKING CATALYST COMPOSITION

(75) Inventors: László Domokos, Amsterdam (NL); Hermanus Jongkind, Amsterdam (NL); Marcello Stefano Rigutto, Amsterdam (NL); Willem Hartman Jurriaan Stork, Amsterdam (NL); Beatrijs Anna Stork-Blaisse, legal representative, Amsterdam (NL); Esther Hillegarda Carola Van De Voort, Amsterdam (NL)

(73) Assignee: Shell Oil Company, Houston, TX (US)

( * ) Notice: Subject to any disclaimer, the term of this patent is extended or adjusted under 35 U.S.C. 154(b) by 616 days.

(21) Appl. No.: 11/222,393

(22) Filed: Sep. 8, 2005

(65) Prior Publication Data

US 2006/0207917 A1  Sep. 21, 2006

(30) Foreign Application Priority Data

Sep. 8, 2004  (EP)  ................................. 04255442

(51) Int. Cl.
   *C10G 11/00* (2006.01)
(52) U.S. Cl. ................. 502/234; 502/233; 502/235; 502/60; 502/63; 502/64; 502/66; 502/67; 502/73; 502/74; 208/120.1
(58) Field of Classification Search ................ 208/111, 208/111.3, 111.35, 113, 123, 124, 120.1; 502/60, 63–64, 66–67, 74, 233–234
   See application file for complete search history.

(56) References Cited

U.S. PATENT DOCUMENTS

| | | | |
|---|---|---|---|
| 2,554,282 A | 5/1951 | Voorhies, Jr. | 196/78 |
| 3,016,347 A | 1/1962 | O'Hara | 208/216 |
| 3,016,647 A | 1/1962 | Peterson et al. | |
| 3,232,863 A | 2/1966 | Watson et al. | 208/36 |
| 3,403,092 A | 9/1968 | Rausch | 208/36 |
| 3,535,110 A | 10/1970 | Todd | 75/202 |
| 3,536,605 A | 10/1970 | Kittrell | 208/59 |
| 3,591,362 A | 7/1971 | Benjamin | 75/0.5 BA |
| 3,671,201 A | 6/1972 | Bergna | 29/182.5 |
| 3,676,161 A | 7/1972 | Yates | 106/55 |
| 3,809,545 A | 5/1974 | Benjamin | 75/0.5 R |
| 3,817,873 A | 6/1974 | Mickelson | 252/435 |
| 3,823,502 A | 7/1974 | Countryman | 43/20 |
| 3,825,502 A | 7/1974 | Takenaka et al. | 252/456 |
| 3,825,504 A | 7/1974 | Hilfman | 252/464 |
| 3,875,081 A | 4/1975 | Young | 252/455 |
| 3,994,833 A | 11/1976 | Jouy et al. | 252/469 |
| 4,206,036 A | 6/1980 | Takeuchi et al. | 208/89 |
| 4,240,931 A | 12/1980 | Milberger et al. | 252/438 |
| 4,404,097 A | 9/1983 | Angevine et al. | 208/210 |
| 4,408,067 A | 10/1983 | Nakamura et al. | 560/215 |
| 4,459,369 A | 7/1984 | Passariello | 502/306 |
| 4,491,639 A | 1/1985 | Happel et al. | 502/219 |
| 4,655,906 A | 4/1987 | Bjornson et al. | 208/217 |
| 4,849,392 A | 7/1989 | Hums et al. | 502/209 |
| 4,851,381 A | 7/1989 | Hums | 502/209 |
| 4,857,171 A | 8/1989 | Hoek et al. | 208/111 |
| 4,925,825 A | 5/1990 | Tachi et al. | 502/309 |
| 5,036,037 A | 7/1991 | Kladnig et al. | 502/319 |
| 5,082,820 A | 1/1992 | Mitsui et al. | 502/350 |
| 5,244,858 A | 9/1993 | Usui et al. | 502/220 |
| 5,403,806 A | 4/1995 | Simpson | 502/211 |
| 5,409,681 A | 4/1995 | Kato et al. | 423/239.1 |
| 5,582,809 A | 12/1996 | Rikimaru et al. | 423/239.1 |
| 5,648,311 A | 7/1997 | Herda et al. | 502/315 |
| 5,658,546 A | 8/1997 | Kobayashi et al. | 423/239.1 |
| 5,945,372 A | 8/1999 | Landgraf et al. | 502/350 |
| 6,124,232 A | 9/2000 | Chang et al. | 402/308 |
| 6,162,350 A | 12/2000 | Soled et al. | 208/113 |
| 6,242,379 B1 | 6/2001 | Williams et al. | 502/300 |
| 6,383,975 B1 | 5/2002 | Rocha et al. | 502/309 |
| 6,444,608 B1 | 9/2002 | Oki et al. | 502/300 |
| 6,479,428 B1 | 11/2002 | Tonkovich et al. | 502/302 |
| 6,586,361 B1 | 7/2003 | Heidemann et al. | 502/353 |
| 6,638,486 B2 | 10/2003 | Masaki et al. | 423/213.2 |
| 6,638,890 B2 | 10/2003 | Tanimoto et al. | 502/300 |
| 6,712,953 B1 * | 3/2004 | Kasztelan et al. | 208/111.01 |
| 6,716,404 B2 | 4/2004 | Masaki | 423/213.2 |
| 6,780,816 B2 | 8/2004 | Tanimoto et al. | 502/300 |
| 6,870,014 B2 | 3/2005 | Steinbrenner et al. | 526/90 |

FOREIGN PATENT DOCUMENTS

| | | |
|---|---|---|
| EP | 28938 | 12/1980 |
| EP | 731156 | 9/1996 |
| EP | 1090682 | 4/2001 |
| EP | 1090683 | 4/2001 |
| GB | 1178854 | 1/1978 |
| GB | 2114594 | 8/1983 |
| WO | 00/41810 | 7/2000 |
| WO | 00/41811 | 7/2000 |

(Continued)

OTHER PUBLICATIONS

Kishore, K. and Ganesh, K. (1995) "Polymers containing disulfide, tetrasulfide, diselenide, and ditelluride linkages in the main chain." Advances in Polymer Science, 121, pp. 81-121.*

(Continued)

*Primary Examiner*—Robert J Hill, Jr.
*Assistant Examiner*—Brian McCaig
(74) *Attorney, Agent, or Firm*—Charles W. Stewart; Leonard P. Miller

(57) ABSTRACT

The invention provides an unsupported catalyst composition which comprises one or more Group VIb metals, one or more Group VIII metals, one or more zeolites, and, optionally, a refractory oxide material. A (co)precipitation preparation process is described and also use of the composition in hydrocracking.

26 Claims, No Drawings

FOREIGN PATENT DOCUMENTS

| WO | 00/42119 | 7/2000 |
| WO | 00/42120 | 7/2000 |
| WO | 00/42124 | 7/2000 |
| WO | 00/42125 | 7/2000 |
| WO | 00/42126 | 7/2000 |
| WO | 00/42128 | 7/2000 |
| WO | 00/42129 | 7/2000 |
| WO | 00/73402 | 12/2000 |
| WO | 02/04118 | 1/2002 |

OTHER PUBLICATIONS

Hensen, E.J.M. et al. (2003). Catalysis Today, 86(1-4), 87-109.*

"Hydrodesulfurization of Methyl-Substituted Dibenzithiophenes: Fundamental Study of Routes to Deep Desulfurization," by M.V. Landau, D. berger, and M. Herskowitz, Journal of Catalysis 159, (1996) pp. 236-245.

* cited by examiner

HYDROCRACKING CATALYST COMPOSITION

FIELD OF THE INVENTION

The present invention concerns hydrocracking compositions, their preparation and their use in hydrocracking.

BACKGROUND OF THE INVENTION

Of the many conversion processes known in the refining art, hydrocracking has assumed a greater importance over the years since it offers the refiner product flexibility combined with product quality.

There has been considerable effort devoted to the development of hydrocracking catalysts which combine high cracking activity with a low tendency to overcrack towards light products and, in particular, to the less valuable $C_1$-$C_3$ and $C_4$ gaseous by-products. Kerosine and gas oil (the fractions boiling at a temperature in the range of from 150 to 370° C.; also commonly termed middle distillates) are often the desired products of a hydrocracking process.

Such hydrocracking catalysts are typically based on a shaped support prepared from a single, active cracking component such as an aluminosilicate, especially a Y zeolite component, comulled and extruded with a refractory oxide binder, with subsequent impregnation of hydrogenation metals.

Alternative catalyst forms have been proposed for use in the hydroprocessing of, for example, refinery streams. One such group of catalysts are termed 'bulk catalysts'. Such catalysts are formed from metal compounds only, usually by co-precipitation techniques, and have no need for a catalyst carrier or support; see for example WO 00/42119, U.S. Pat. No. 6,162,350 and WO 00/41810. These publications disclose bulk Group VIII and Group VIb metal catalysts and their preparation and use. U.S. Pat. No. 6,162,350 discloses that such catalysts may contain one or more of each metal type, and examples show NiMo, NiW and the most preferred NiMoW bulk catalysts A binder if present is preferably added after the preparation of the bulk metal composition and prior to shaping.

By co-precipitation, the incorporation of a dispersed metals content into a conventional carrier material is attempted by enabling intimate contact between metals compounds and carrier material and thus enabling the metals to become dispersed through the carrier material before shaping. This contrasts with conventional impregnation techniques where only a small amount of metals deposition is possible since the shaped carrier is already formed and there are diffusional and space limitations for the metal ions or compounds to become dispersed through the catalyst support.

In U.S. Pat. No. 6,162,350 the use of other catalytic components with the bulk catalysts is envisaged. Thus cracking components such as ZSM-5, zeolite Y and amorphous cracking components may be composited with the bulk catalyst composition. Preferably this occurs after the composition is formed and alongside the incorporation of a binder material prior to shaping to form a cracking catalyst support in conventional manner.

Copending International Patent Application No. PCT/EP2004/050196, published as WO 2004/073859, discloses the preparation of a quasi-bulk metal catalyst composition in which binder materials are advantageously incorporated into the compositions during precipitation. Following formation, this material too can be composited with other components such as cracking components.

Thus where cracking components are to be incorporated into such bulk metal compositions the teaching is that this is preferred via mixing or co-mulling after the preparation of the bulk metal composition.

Coprecipitation of a zeolitic material and a Group VIb hydrogenation metal component to form a hydrocracking catalyst is disclosed in U.S. Pat. No. 3,853,747 which proposes the preparation of a hydrocracking catalyst having improved activity by combining a finely divided Group VIb (eg molybdenum) compound in substantially undissolved form with a crystalline aluminosilicate base in an aqueous medium having a pH below 6. A precipitated metals-containing zeolite results. The pH level is set at below 6 to ensure the insolubility of the metal compound and to promote precipitation without destruction of the zeolites crystalline structure. The aim of the preparation is to ensure that the metal is concentrated on the external surface of the zeolite, to avoid impregnation of the inner adsorption area, and to ensure that the zeolite crystal structure and acidity is not destroyed at any stage during the catalyst preparation by use of soluble molybdenum or tungsten compounds.

International Patent Specification No. WO 01/00753 considers the effect on middle distillate selectivity where an amount of hydrogenation metals is contained within the pores of a zeolite before formulation into a hydrocracking catalyst. Middle distillate selectivity gain is said to be achieved by incorporation of the hydrogenation metals into the zeolite pores, eg by impregnation of the zeolite with the metals prior to shaping the support. Broad ranges of from 0.1 to 10 wt % of Group VIII metal (on oxide basis) and from 0.1 to 10 wt % of Group VIb metal (on oxide basis) are disclosed, but the most preferred amounts incorporated are from 0 (sic) to 5 wt %, of Group VIII metal (on oxide basis) and from 0.1 to 3 wt %, of Group VIb metal (on oxide basis). A certain amount of hydrogenation metals will, however, inevitably be incorporated into the zeolitic pores during conventional catalyst preparation. We have found that in fact by conventional impregnation preparation techniques this preferred level of Group VIb metal, eg molybdenum, can commonly exist in zeolite Y based hydrocracking catalysts.

Generally the teaching of the art is that while it can be advantageous to incorporate hydrogenation metals into the pores of zeolitic materials, precipitation techniques have to be utilised carefully or risk the destruction of the zeolite crystal structure.

SUMMARY OF THE INVENTION

It has now surprisingly been found that zeolitic materials can be incorporated into an unsupported or precipitated catalyst during preparation, and that the resulting hydrocracking catalyst composition has significant advantages for hydrocracking than when formulated via co-mulling and extrusion. The mono-aromatics hydrogenation activity of such compositions is extremely high and in preferred compositions, product selectivity to middle distillates is also significantly better. Even though a significantly high aromatics hydrogenation is achieved, the hydrogen consumption requirement is surprisingly lower than that needed by conventionally prepared catalysts.

Against the teaching of the prior art, it has been found possible to prepare such precipitated compositions utilising precipitation mixtures having a neutral to alkaline pH, and also utilising soluble or partly soluble Group VIb metal compounds, without damage to the zeolite crystal structure nor loss of hydrocracking activity; indeed such materials can have a higher hydrocracking middle distillate selectivity than conventionally prepared catalysts.

Accordingly the present invention provides an unsupported catalyst composition which comprises one or more Group VIb metals, one or more non-noble Group VIII metals, one or more zeolites, and, optionally, one or more refractory oxide materials Also provided is a process for the preparation of the catalyst composition of the invention, and its use in hydrocracking.

DETAILED DESCRIPTION OF THE INVENTION

This invention relates to the hydrocracking of petroleum feedstocks using an unsupported catalyst composition containing Group VIII (especially Ni and/or Co) and Group VIB (especially Mo and/or W) metals, a zeolite, and an optional inert refractory oxide.

Herein reference is made to the Periodic Table of Elements which appears on the inside cover of the CRC Handbook of Chemistry and Physics ('The Rubber Handbook'), 66$^{th}$ edition and using the CAS version notation.

By the term 'unsupported' it is to be understood that the composition is not of the conventional form which has a preformed, shaped catalyst support which is then loaded with metals via impregnation or deposition, nor of a form wherein metals plus support materials are co-mulled or combined together by physical means but is a composition in which the metals, zeolite, and optional refractory oxide material are combined together at one and the same time via a chemical process wherein the composition is formed prior to any shaping step. Generally this chemical combination will occur through precipitation. Thus, the term 'unsupported' may be used herein interchangeably with the term 'precipitated' but only in relation to the catalyst composition of the present invention. Unlike supported catalysts, in this unsupported catalyst composition any refractory oxide material is no longer a separate distinct material within the composition; however, the crystalline structure of the zeolite component is surprisingly retained intact. In fact it has been found that the metals, mainly the Group VIb metal, and especially the metal molybdenum, become incorporated within the pores of the zeolite in significant amounts.

The Group VIII metal is preferably one or two non-noble metals selected from nickel, cobalt and iron. Preferably the Group VIII metal is selected from nickel, cobalt and a combination of nickel and cobalt. Most preferably the Group VIII metal is nickel. The Group VIb metal is preferably one or two metals selected from chromium, molybdenum and tungsten. The Group VIb metal is more preferably selected from molybdenum, tungsten and a combination of the two. The most preferred Group VIb metal is molybdenum. Noble metals of Group VIII are often used in catalyst compositions where hydrogenation is a desired aim, especially platinum and palladium metals which have become the predominant metals of choice for hydrogenation catalysts. However, the surprisingly high hydrogenation activity of the materials of the present invention means that there is no need to utilise these expensive materials.

The zeolite component is suitably a crystalline molecular sieve selected from those having pores with a largest diameter greater than 0.6 nm (crystallographic free diameters, calculated as in the "Atlas of Zeolite Framework Types", Ch. Baerlocher, W. M. Meier, and D. H. Olson, 5$^{th}$ Edition, Elsevier Amsterdam 2001), those having pores with diameter greater than 0.6 nm as determined from the Horvath-Kawazoe pore size distribution derived from argon or nitrogen adsorption isotherms, and those of structure type AEL, EUO, FER, MFI, MEL, MTT, MTW, MWW and TON.

In the context of the present specification, the term "molecular sieve" also includes the corresponding (hydrothermally) stabilised and dealuminated derivatives and such derivatives as may be obtained by isomorphous substitution and cation exchange. Methods for the cation exchange, (hydrothermal) stabilisation, dealumination and isomorphous substitution of molecular sieves are well known in the art and are not therefore further discussed in the present specification.

In the present specification, unless otherwise indicated, the silica to alumina molar ratio of a zeolite is the molar ratio as determined on the basis of the total or overall amount of aluminum and silicon (framework and non-framework) present in the zeolite.

The zeolite component may be formed of a single zeolite material or a combination of two or more of the same or different zeolite types.

Preferably, the zeolite is selected from one or more crystalline molecular sieves of structure type FAU, EMT, -CLO, VFI, AET, CFI, DON, OSO, AFI, AFR, AFS, AFY, ATS, *BEA, BOG, BPH, CON, CZP, DFO, GME, GON, IFR, ISV, LTL, MAZ, MEI, MOR, MTW, OFF, SAO, SBE, SBS, SBT, SFE, ETR, IWR, SSY, USI, UOZ, AEL, EUO, FER, MFI, MEL, MTT, MTW, MWW, TON, members of the disordered structure families beta, SSZ-33, faujasite, MTT/TON, SFF/STF and ZSM-48 as described in the "Atlas of Zeolite Framework Types, idem., and also the "Database of Zeolite Structure Types" (Ch. Baerlocher and L. B. McCusker, http://www.iza-structure.org/databases/), ITQ-15, ITQ-21, and ITQ-25.

More preferably the zeolite may be one or more of zeolite Y, ZSM-5, ZSM-12, and zeolite beta.

Most preferably, the zeolite is a crystalline molecular sieve of structure type FAU, e.g. an ultrastable zeolite Y (USY) or a very ultrastable zeolite Y (VUSY) of unit cell size ($a_o$) less than 2.440 nm (24.40 Ångstroms), in particular less than 2.435 nm (24.35 Ångstroms) as are known, for example, from European Patent Specifications Nos. 247 678 and 247 679, U.S. Pat. No. 4,784,750, International Patent Specification No. WO 2004/047988 and US Patent Specification No. 2002/094931.

Whilst USY and VUSY Y zeolites are the preferred form of zeolite component used in the present invention, other Y zeolite forms are also suitable for use, for example the known ultrahydrophobic Y zeolites. More than one Y zeolite form may be used: suitably two zeolites of different unit cell size, for example an USY zeolite in combination with a VUSY zeolite.

The preferred VUSY zeolite of EP-A-247 678 or EP-A-247 679 is characterised by a unit cell size below 2.445 nm (24.45 Ångstroms) or 2.435 nm (24.35 Ångstroms), a water adsorption capacity (at 25° C. and a $p/p_o$ value of 0.2) of at least 8 wt % of the zeolite and a pore volume of at least 0.25 ml/g wherein between 10% and 60% of the total pore volume is made up of pores having a diameter of at least 8 nm. Most preferred are the low unit cell size, high surface area zeolite Y materials of WO 2004/047988. Such materials can be described as a zeolite of the faujasite structure having a unit cell size in the range of from 2.410 to 2.440 nm (24.10 to 24.40 Å), a bulk silica to alumina ratio (SAR) above 12, and a surface area of at least 850 m$^2$/g as measured by the BET method and ATSM D 4365-95 with nitrogen adsorption at a p/po value of 0.03.

Where a zeolite beta is utilised in or as part of the zeolite component this may be any catalytically active zeolite beta—a crystalline zeolite described in U.S. Pat. No. Re 28,341 or known from the Atlas of Zeolite Structure Types, 3rd Edition, published in 1992 on behalf of the Structure Commission of the International Zeolite Association. Small crystal size zeolite beta is a particularly useful material in cracking compositions. The zeolite beta crystals are preferably less than 100 nm in size, e.g. up to 99 nm in size. More preferably, the crystals are in the range of from 20 to 95 nm in size, most preferably 70 nm or less, for example from 30, 40 or from 50 to 70 nm, in size. Suitably, the zeolite beta has a silica to alumina molar ratio of at least 20, preferably at least 25. Zeolite beta with a higher silica to alumina molar ratio, e.g. up to, and including 60, 80, 100, 120 or 150, may also be used if desired. Thus, the zeolite beta may have a silica to alumina molar ratio in the range of from 20 to 60, 25 to 60, 20 to 80, 25 to 80, 20 to 100, 25 to 100, 20 to 120, 25 to 120, 20 to 150 or 25 to 150. It is also suitable, and may be preferred, to use a high SAR zeolite beta, for example a Beta zeolite which has a SAR of 150 or more, preferably 150 to 400, more preferably 200 to 350, especially 300.

Suitable zeolite beta materials are commonly available commercially, such as from the PQ Corporation or from Zeolyst International.

If refractory oxide material is used, then suitably this is selected from alumina, silica, titania, magnesia, zirconia, boria, zinc oxide, zinc hydroxide, natural and synthetic clays, and mixtures of two or more thereof. Preferred materials are silica, titania, amorphous silica alumina and alumina. Alumina and/or amorphous silica alumina are conventional binder materials for hydrocracking compositions; however, surprisingly, extremely useful compositions are given without the use of any alumina binder component at all.

The form of alumina utilised is not limited and any alumina or alumina precursor commonly used in catalyst carriers may be used in the present invention. Very suitable alumina materials are boehmite, pseudoboehmite, bayerite, alpha-alumina, gamma-alumina, theta-alumina and eta-alumina.

For amorporhous silica alumina, the term "amorphous" indicates a lack of crystal structure, as defined by X-ray diffraction, in the material, although some short range ordering may be present. Amorphous silica-alumina suitable for use in the present invention is available commercially. Alternatively, the silica-alumina may be prepared by a co-gelation process or a grafting process, as are well known in the art. The amorphous silica-alumina preferably contains silica in an amount in the range of from 25 to 95% by weight. More preferably the amount of silica is greater than 35 wt %, and most preferably at least 40 wt %. A very suitable amorphous silica-alumina product for use in preparing the catalyst carrier comprises 45% by weight silica and 55% by weight alumina and is commercially available (ex. Criterion Catalysts and Technologies, USA).

Titania is naturally available in several forms or polymorphs: rutile, anatase and brookite. The most thermally stable form of titania is rutile and at very high temperatures the anatase form can transform into the rutile form. Any of these forms of titania may be present in the catalyst composition of the invention. The B.E.T. surface area of the titania utilised is suitably in the range of from 10 to 700 m$^2$/g, more preferably from 20 to 400 m$^2$/g.

It has been found that the particle size of the titania can influence and accentuate the activity of the final catalyst composition. While all titania powders are suitable for use in the present invention, it is preferred that titania powder having an average particle diameter of 50 microns or less is used, preferably a particle diameter of 20 microns or less and especially a particle diameter of 5 microns or less. Generally the minimum average particle diameter of particle in the titania utilised is of the order of 0.005 micron. Herein average particle diameter is the diameter of 50% of the particles, also termed $D_{v50}$.

Very suitable titania starting materials are available from Millenium Chemicals, Degussa and Haishunde. For example Millenium's DT-51D and G5 grades; Degussa's P25 grade and Haishunde's grade FCT010925. Mixtures of titania and other refractory oxide materials are also readily available commercially, for example silica—titania mixtures such as grade FTS 01 from Haishunde.

Most preferred particularly where a high middle distillate selectivity is especially desired is the use of amorphous silica alumina or silica alone, and especially preferred is the use of silica alone. The form of amorphous silica alumina or silica utilised is not limited and any amorphous silica alumina or silica commonly used in catalyst carriers may be used in the present invention. A very suitable silica material is Sipernat 50, a white silica powder having predominantly spherical particles, available commercially from Degussa (Sipernat is a trade name).

Where high mono-aromatics hydrogenation is the main interest, then the use of titania alone is particularly preferred.

Even more preferred however is that the composition of the present invention contains substantially no refractory oxide material.

Depending on the method of preparation that is followed to prepare the catalyst composition for use in the invention, there could be residual ammonia, organic species and/or water species present; following different methods, different amounts as well as different types of species can be present. In respect of water, also atmospheric conditions can affect the amount present in the catalyst composition. Therefore to ensure that the catalyst composition definition is not distorted by atmospheric or preparation conditions, the proportions mentioned herein, eg on percentage amounts, are given on an oxide basis.

To establish the catalyst composition on an oxide basis, an elemental analysis is performed on a sample once all volatiles have been removed, eg by thorough heating for example at a temperature in excess of 400° C. for a minimum of 60 minutes, in accordance with standard practice in the art.

Expressed on a percentage weight basis, very suitably the total amount of Group VIII and Group VIb metals lies in the range of from 15 to 99 wt % as the oxides and based on total catalyst, but preferably is in the range of from 20 to 80. Where a refractory oxide is present then the amount is more preferably in the range of from 25 to 70, especially 25 to 60 wt %.

The molar ratio of Group VIII metal(s) to Group VIb metal(s) is very suitably in the range from 0.5:1 to 3:1, preferably 0.5:1 to 2.0:1, and is especially 1:1.

Good results have been obtained when the Group VIII metal is nickel and the Group VIb metal is molybdenum, present in a molar ratio of nickel to molybdenum in the range from 0.5:1 to 3:1, preferably 0.5:1 to 2.0:1, and is especially 1:1.

The zeolite content is suitably in the range of from 1 to 85 wt %. Usefully the minimum amount of zeolite is 4 wt %, preferably 15 wt %, more preferably 20 wt %, for example 25 wt %, and especially 40 wt %, basis total composition. Usefully the maximum amount of zeolite, basis total composition, is 80 wt %, and especially 75 wt %.

The refractory oxide material is suitably in an amount in the range of from 0 to 70 wt %, preferably 0 to 50 wt %, on oxide basis. More preferred compositions contain from 5 to 40 wt % on an oxide basis. Most preferably, however, no refractory oxide is present.

Good results have been obtained with nickel present in an amount in the range of from 7 to 30 wt %, preferably 13 to 26 wt %, on an oxide basis; molybdenum present in an amount in the range of from 14 to 50 wt %, preferably 25 to 50 wt % on an oxide basis; with the balance being zeolite VUSY and silica or titania, when present. The proportion of zeolite VUSY present in formulations yielding good results is in the range of from 20 to 73 wt %. When present in such formulations, silica or titania amounts are in the range of from 6 to 10 wt %, preferably 6 to 9 wt %. Where a second zeolite is present, for example zeolite beta, then an amount in the range of from 1 to 10 wt % is preferred.

In a catalyst composition for use in the invention, when not assessed on an oxide basis, there may be in the range of from 0 to 10 wt %, basis total catalyst, of residual species, eg organics, ammonia and/or water species, and most commonly from 3 to 8 wt %. The presence and amount of such components can be determined by standard analysis techniques.

The catalyst composition of the present invention may be prepared by any suitable precipitation or equivalent process. The present invention therefore further provides a process for the preparation of a catalyst composition of the present invention, wherein one or more Group VIb metal compounds are combined with one or more non-noble Group VIII metal compounds, one or more zeolites and, optionally, one or more refractory oxide materials, in the presence of a protic liquid and optionally an alkali compound; and the catalyst composition is recovered following precipitation. The preparation process may very suitably be by the procedure described in U.S. Pat. No. 6,162,350, or in WO 00/41810, in which the metal compounds are either fully dissolved or partly dissolved in the liquid used, suitably protic liquid, especially water or water-containing liquid, with the addition of the appropriate amount of zeolite and optional refractory oxide material to one of the starting components or to a mixture of starting components.

Most preferably, however, the preparation is by a process which comprises heating a precursor composition which is in the form of, or is recovered from, a slurry, optionally after aging at a temperature in the range of from 20 to 95° C. for a minimum of 10 minutes, said slurry being obtained by (co)precipitating, at a sufficient time and temperature, one or more Group VIb metal compounds, one or more Group VIII metal compounds, one or more zeolites, optionally one or more refractory oxide materials, and an alkali compound, in a protic liquid. This process yields material which gives high crush strength when shaped eg extruded. Where the metal compounds are used as solids (and one or more partly dissolve when coming into contact with the protic liquid), the crush strength of the resulting shaped catalyst may become higher.

Thus preferably, the metal compounds utilised in the process of the invention are added to the protic liquid in solid form.

The metal compounds and refractory oxide are suitably utilised in the percentage weight amounts already discussed above.

The decomposition or heating of the precursor is performed at an elevated temperature in the range of from 100 to 600° C., preferably from 120 to 450° C., more preferably at a temperature in the range of from 250 to 400° C. The decomposition may take place in an inert atmosphere, such as under nitrogen, any noble gas or a mixture thereof, or in an oxidative atmosphere, e.g. in oxygen, oxygen-nitrogen, air, or a mixture of one or more thereof, or in a reductive atmosphere, such as of hydrogen, hydrogen sulfide, or a mixture thereof. The decomposition may take place during processing of the slurry or during further processing of the composition for use, eg during extrusion or calcination before or after shaping.

The preferred preparation process of the present invention involves contacting one or more slurries of the desired metals in a protic liquid (for example water) wherein one or more of the metal compounds, especially both, are in solid and dissolved phase simultaneously, with a zeolite and optional refractory oxide in the presence of an alkali compound at a temperature and for a time sufficient to produce the precursor. It is possible for each metal type that the metal is provided by two metal compounds, one of which is soluble in the protic liquid and the other of which is only partly soluble. Metal in this context does not refer to the metals in metallic phase but to metallic compounds containing the necessary metal ions.

It is possible for all components to be added to the protic liquid at the same time or sequentially. Also it is possible for one or more of the metal compounds, the zeolite and the refractory oxide to be in slurry phase with the protic liquid, and for the remaining components to be added thereto.

The process of the invention most suitably involves the mixing of slurry phase mixtures of the Group VIb and Group VIII metal(s) compounds in water or other protic liquid blended at elevated temperature with a slurry of the zeolite in water, or other protic liquid, and subsequently to add at an elevated temperature an alkali compound and optionally the refractory oxide material also in water or other protic liquid. While the order of addition to form slurries from the individual compounds is not critical for the formation of the catalyst composition of the invention, we have found that when the alkali compound is added to a slurry of partly dissolved metals, the zeolite and the refractory oxide, very useful catalytic materials are given. It is, however, possible to add the metals' slurry to the alkali compound, with the zeolite and the refractory oxide present in one or the other or both, and still obtain useful catalytic compositions.

Blending or mixing can be carried out by any conventional means, eg an anchor stirrer, or a high energy, high impact method, for example using an Ultra Turrax machine.

During the mixing or blending process, the components of the slurries (co)precipitate to form solids of the precursor composition preferably under the action of the alkali precipitation agent. Normally the term 'co-precipitation' is used when two or more compounds that are dissolved, precipitate out of solution together. In the preferred process of the invention, a portion of the compounds are not dissolved and it is possible that one or more dissolved components precipitate onto the solid component(s). Therefore we prefer to use herein the terminology '(co)precipitation' when referring to precipitation of materials at least one of which is in a partly dissolved state. The process of the invention is suitably controlled through the maintenance of an appropriate temperature for an appropriate time to achieve the desired precursor. It is a routine matter to determine the appropriate temperature/time combinations for a desired end product. Suitably the temperature will lie in the range of from 25 to 95° C. and the (co)precipitation time will lie in the range of from 10 minutes to 2 hours. While essentially desired end products will arise from a control of both conditions, it is noted that operating the (co)precipitation process at higher temperatures may cause too much dissolution of the metals components to enable a good end-product; at too low a temperature then insufficient dissolution may occur.

In a preferred embodiment, an initial slurry concentration of in the range of from 2 to 40, preferably 2 to 25 wt % of nominal solids content is aimed for. By nominal solids content, the amount of solids added to the protic liquid is intended. Preferably the amount of alkali compound, eg ammonia, in the slurry is at least 0.2 mol per mol of metals, on an oxide basis, and at most 50 mol per mol of metals, on an oxide basis. The quantity of alkaline material can affect the final form of the catalyst composition. The amount of alkaline material, eg ammonia, preferably applied should be at least 0.75 mol, more preferably at least 0.8, especially at least 0.9 mol, per mol metals, oxide basis. The amount of alkali compound utilized is preferably at most 5, more preferably at most 3, and especially at most 2, mol per mol metals, oxide basis.

The pH of the final slurry mixture is generally neutral to alkaline, and is suitably at least 6.0, and even more suitably at least 6.5. Generally the pH of the final mixture is in the range of from 6.5 to 9.0, preferably from 6.8 to 8.5. The measured value of pH can be influenced by the temperature of the mixture. To assess accurately and with consistency the pH of the heated final slurry mixture, it is useful to remove a small sample, cool it to ambient temperature and then to measure the pH by conventional means. Contrary to the teaching of the prior art, at such pH levels, the zeolitic material has been found to retain fully its crystal structure both during the precipitation and during subsequent recovery, drying and calcination procedures.

Suitable Group VIII compounds, which stay in partly solid phase if the solvent is water, and therefore are preferred, are nickel carbonate, nickel oxide, nickel hydroxide, nickel phosphate, nickel formiate, nickel sulfide, nickel molybdate, or a mixture of two or more thereof. Additionally soluble salts such as nickel nitrate, sulphate or acetate may be used in combination with one or more of these compounds and/or with each other. The corresponding cobalt or other Group VIII metal compounds are also suitable. Suitable, and preferred, molybdenum compounds (based on similar criteria) are molybdenum (di or tri) oxide, ammonium molybdate, molybdic acid, molybdenum sulfide, or mixtures thereof. These materials are commercially available or can be prepared by commonly known laboratory practices, e.g. by precipitation. The corresponding tungsten or other Group VIb metal compounds are also suitable.

Starting materials having a C, H, and O component in addition to the desired metals are, in general, more preferred due to a lesser impact on the environment. Nickel carbonate is therefore more preferred, since it can decompose to nickel oxide, carbon dioxide and water upon heating, based on the carbonate content of the starting material.

The terms 'alkali or alkaline compound' are used herein to indicate any compound that will yield a pH of at least 6.0 with the protic liquid when measured at ambient temperature (20° C.).

Suitable alkali compounds applied are selected from hydroxides or oxohydroxides, for example, Group IA, or IB or Group IIA, or IIb hydroxides; Group IA or Group IIA silicates; Group IA, or IB or Group IIA or IIB carbonates; and equivalent ammonium compounds; or mixtures of any two or more thereof. Suitable examples include ammonium hydroxide, sodium hydroxide, ammonium silicate, ammonium carbonate, and sodium carbonate.

Also suitable for use as an alkali compound are any basic, nitrogen-containing organic compounds, eg selected from aliphatic or aromatic amines and polyimines like polyethylenimine; pyridine derivatives; amino alcohols; amino acid salts; and urea and substituted urea derivatives which produce ammonia or amines upon heating in water.

Preferably the alkali compound is one that will generate ammonium ions in solution; this includes ammonia which, with water as the solvent, will generate the ammonium hydroxide form.

It is generally preferred to utilise mixing and precipitation conditions, which keep the solvents below the boiling point temperatures of the applied solvent, i.e. below 100° C. in case of water. The pH of the slurries is generally kept at their natural pH during the entire preparation process. However additional adjustment of the pH can be conveniently achieved, if desired, by using suitable acidic or additional alkaline compounds as generally known in the art.

The formed slurry is optionally held at ambient or elevated temperature for a period of time (commonly termed ageing) subsequent to the end of the (co)precipitation process. The ageing time usually lies in the range of from 10 minutes, suitably 30 minutes, to preferably 4 hours; the ageing temperature may be in the range of from ambient temperature, for example, from 20, suitably from 25° C., to 95° C., preferably from 55 to 90, and especially from 60 to 80° C. The ageing period is optionally followed by cooling the obtained mixture to a lower temperature.

After optional cooling, the obtained slurry may be processed in a number of different ways in order to regain the solid content, which process can involve filtration, spray drying, flash drying, evaporation, and vacuum distillation. By evaporation, any process of driving off the protic liquid, e.g. water, or drying is intended, for example dessication and boil down processes. The system used will depend on a number of local factors including environmental legislations, and energy availability. Most preferred is spray drying.

The most preferred combination is to use the preferred slurry preparation process (utilising alkali compound) in combination with spray drying.

The so-prepared solid product is a powder which has a loss on ignition LOI of 5 to 95%, suitably 10 to 20%, and conveniently 15 to 20%.

Herein loss on ignition (LOI) for a material is the relative amount of lost mass upon heating the material to 540° C. following the procedure: The sample is mixed well to prevent any inhomogeneity. The weighed sample is transferred into a weighed and precalcined crucible. The crucible is place to a preheated oven at 540° C. for a minimum time of 15 minutes, but typically for 1 hour. The crucible containing the dried sample is weighed again, and the LOI is determined according to the formula:

$$LOI\% = (w - w_{calc})/w * 100\%$$

where w is the original weight of the sample, $w_{calc}$ is the weight of the calcined sample after heating in the oven, both corrected with the weight of the crucible.

The prepared powder may be dried before optional further processing, especially where filtration. has been used to isolate or recover the solids. This drying or ageing can take place in any suitable atmosphere, e.g. inert, such as nitrogen, noble gases, or mixtures thereof, or oxidative gases, such as oxygen, oxygen-nitrogen mixture, air, or mixtures thereof, or a reductive atmosphere, such as hydrogen, or mixtures of reductive and inert gases or mixtures thereof, with or without ammonia and/or water moisture present. The drying temperature is preferred to lie in the range of from 20, usually 25, to 200° C., preferably 55 to 150° C. and especially from 70 to 130° C.

The powder may be used as such or, more preferably is used as a shaped catalyst formulation.

Optionally the obtained powder is calcined prior to shaping. Suitable calcination temperatures are in the range of from 100 to 600° C., preferably from 120 to 450° C. eg under 400° C. and very suitably at substantially 300° C. The calcination may also be carried out in any suitable atmosphere, e.g. inert gases as nitrogen, noble gases or a mixture thereof, or in a reactive atmosphere, e.g. oxygen, oxygen-nitrogen, air, or a mixture of one or more thereof, or a mixture of inert and reactive gases.

Prior to shaping, the obtained powder is optionally mixed with additional materials in either solid or liquid phase. Those in solid state include catalytically active materials, e.g. other catalytic materials generally used in hydrocracking applications. Thus the powder may be combined with a further cracking component, such as a zeolitic or other component that promotes hydrocracking, as mentioned above. Certain amorphous silica alumina materials have a cracking function and may be utilised. Where it is desired, other supplementary materials can, of course, be added. These include materials usually added during conventional catalyst preparations. Suitable examples are phosphorus materials, e.g. phosphoric acid, ammonium phosphate, or organic phosphorus compounds, silicon compounds, boron compounds, fluorine containing compounds, rare earth metals, additional transition metals, or mixtures thereof. Phosphorus compounds may be added at any step of the preparation. If e.g. alumina were to be used as part of the refractory oxide material, phosphorus compounds can be used for peptising (with or without nitric acid).

Most often, any additional component may be a diluent or a binder incorporated to influence the physical properties of the catalyst, for example density, attrition resistance and crush strength.

Moreover, added materials may include additives typically referred in the art as 'shaping agents' or 'shaping aids'. Those additives may comprise stearates, surfactants, graphite, or mixtures thereof. For maximum strength in the resulting shaped materials however, particularly where shaping is by extrusion, then it is preferred to minimize the amount of any conventional extrusion aids. Most preferably, shaping is performed by extrusion in the absence of any extrusion aids.

Suitable materials in liquid phase may additionally be added to the shaping mixture obtained, which include protic, e.g. water, polyols, etc., and non-protic liquids, e.g. hydrocarbons. Protic liquids, e.g. water, may be added for example in order to bring the LOI content of the mixture to a suitable level for shaping.

In general, there is no particular order of mixing the materials (in solid and/or liquid form) together. What is important is to ensure that the sample is mixed well to prevent nonhomogenity. The amount of additional solids and liquids added during shaping lies preferentially in the range of from 0 to 95 wt % based on final weight, and depends on the requirements of the anticipated catalytic application. Shaping can be performed in various ways depending on the requirements of the application. Those methods include spray drying, extrusion, beading and/or pelletizing among others.

Sulfidation may be performed in order to turn one or more metals into its active form. If the composition is used as a shaped catalyst composition, then it may be sulfided before and/or after shaping. In general, sulfidation may be carried out by contacting the catalyst or precursor with a sulfur-containing material, e.g. elemental sulfur, sulfides, disulfides, etc. in gas or liquid phase. Sulfidation can be carried out at any step of the shaping procedure, including prior to the first optional drying step. It is preferred, however, that sulfidation is carried out only prior to shaping when any of the subsequent heat treatments performed are carried out under a suitable atmosphere that prevents the conversion of the (partly) sulfided phase back to an oxide state.

Sulfidation procedures are very well known in the art, and consist of either in-situ sulfidation when the catalyst is in position for use, or ex-situ sulfidation which is carried out prior to loading the catalyst in the hydroprocessing unit. Generally both comprise contacting the catalyst with elemental sulphur or a sulphur-containing compound at a temperature, pressure and time sufficient to ensure adequate sulfidation or activation of the oxidic species on the catalyst. The actual temperature, pressure and time required can vary according to the catalyst type and amount, the sulfiding materials used and the reactor. The regime required can be readily ascertained by the skilled person in the art by very routine procedures.

Preferably the sulfidation step is carried out subsequent to the shaping step(s), and, if applied, subsequent to the last calcination step. Common ex-situ procedures are the ACTI-CAT process (CRI International Inc.) and the SULFICAT process (Eurecat US Inc.). It is however preferred that the last sulfidation procedure is carried out in situ as follows.

The catalyst is sulfided into the active catalyst form by means of sulfidation carried out in the presence of hydrogen, by either contacting the catalyst with liquid feedstock (in liquid or partly gaseous phase), which contains and/or is enriched in sulfur, where sulfur is present in the form of an organic sulfur compound and/or elemental sulfur, or in the presence of a sulfur-containing gas, or a mixture thereof.

Good results have been obtained using a conventional in situ gas phase sulfidation procedure.

It is, however, particularly advantageous to perform a conventional in situ liquid phase sulfidation, using a sulphur-containing liquid, especially a gasoil, and following a typical sulfidation procedure. The sulfur containing liquid is conveniently the intended feedstock for the hydrocracking process, spiked, if necessary, with additional sulfur to perform the liquid phase sulfidation. While it is not understood why, sulfidation appears to promote movement of the molybdenum species within the composition and gives rise to an enriched molybdenum content in the pores of the zeolite than when the composition is in the oxidic form. It is further found that sulfided compositions of the present invention have a significantly increased middle distillate selectivity as well as an enhanced mono-aromatics hydrogenation capacity, particularly for compositions containing silica or no refractory oxide material at all. The highest middle distillate selectivities are obtained for compositions sulfided in the liquid phase.

For both gas phase and liquid phase sulfidation procedures, conventional techniques as known in the art may be utilised. Generally, such sulfidation will comprise contacting the catalyst with the sulphur or sulphur-containing material at an elevated temperature and pressure, with preferably successive ramping of the temperature at intervals over time whilst maintaining the same pressure. Generally the sulfidation temperature will be in the range of in excess of ambient (20° C.) to 400° C., and the time will be in the range of from 1 hour to 48 hours, preferably from 10 to 40 hours.

Preferably, the Group VIII and Group VIb metals form an X-ray amorphous phase in either the powder or the final shaped product, as is revealed by the absence of any newly formed crystalline phase in addition to the crystalline zeolite or the refractory oxide, as established by X-ray powder diffraction Catalysts which comprise a catalyst composition of the present invention exhibit a very high activity for monoaromatics hydrogenation during hydrocracking of hydrocarbonaceous feedstocks.

While not wishing to be bound to any theory, it is currently thought that this exceptional activity is the result of a high dispersion factor for the metals through the zeolitic material, achieved through the careful control of the (co)precipitation process. High dispersion should not be confused with uniformity of dispersion; the catalyst compositions for use in and of the invention have a high activity with metals dispersed through the zeolitic material, but are not necessarily uniformly dispersed.

It appears however that a high proportion of the Group VIb metal, especially when molybdenum, becomes contained in the pores of the zeolitic material. Generally in the range of from 3, suitably from 4, preferably from 5, and more preferably from 8, for example 10 to 25 wt % of molybdenum can be located within the zeolitic pores. It has surprisingly been found that, after sulfidation, the sulphidic compositions contain more molybdenum in the zeolitic pores than the original oxidic forms.

Suitable techniques for assessing the amount of molybdenum in zeolite pores are known to those skilled in the art and the main techniques are mentioned in WO 01/00753: utilisation of electron microprobe and transmission electron microscopy using machinery equipped with an energy-dispersive X-ray spectrometer having a detector for identification and qualification of the elements present in the zeolite crystals.

The present invention also provides a process for converting a hydrocarbonaceous feedstock into lower boiling materials which comprises contacting the feedstock with hydrogen at elevated temperature and elevated pressure in the presence of a catalyst composition according to the present invention. This process is commonly called hydrocracking.

Examples of such processes comprise single-stage hydrocracking, two-stage hydrocracking, and series-flow hydrocracking. Definitions of these processes can be found in pages 602 and 603 of Chapter 15 (entitled "Hydrocarbon processing with zeolites") of "Introduction to zeolite science and practice" edited by van Bekkum, Flanigen, Jansen; published by Elsevier, 1991.

It will be appreciated that the hydroconversion processes of the present invention can be carried out in any reaction vessel usual in the art. Thus the process may be performed in a fixed bed or moving bed reactor. Also the catalyst of the invention may be used in conjunction with any suitable co-catalyst or other materials usual in the art. Thus for example the catalyst of the invention may be used in stacked bed formation with one or more other catalysts useful in hydroprocessing, for example with a catalyst containing a different zeolite, with a catalyst containing a faujasite zeolite of different unit cell size, with a catalyst utilizing an amorphous carrier, and so on. Various stacked bed combinations have been proposed in the literature: WO-99/32582; EP-A-310,164; EP-A-310,165; and EP-A-428,224 may, for example, be mentioned.

The hydrocarbonaceous feedstocks useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. The feedstock will generally comprise hydrocarbons having a boiling point of at least 330° C. The boiling range will generally be from about 330 to 650° C., with preference being given to feedstocks having a boiling range of from about 340 to 620° C. The feedstock may have a nitrogen content of up to 5000 ppmw (parts per million by weight) and a sulphur content of up to 6% w. Typically, nitrogen contents are in the range from 250 to 2000 ppmw and sulphur contents are in the range from 0.2 to 5% w. It is possible and may sometimes be desirable to subject part or all of the feedstock to a pre-treatment, for example, hydrodenitrogenation, hydrodesulfurisation or hydrodemetallisation, methods for which are known in the art.

The process of the invention may conveniently be carried out at a reaction temperature in the range of from 250 to 500° C., preferably in the range of from 300 to 450° C.

The present process is preferably carried out at a total pressure (at the reactor inlet) in the range of from $3 \times 10^6$ to $3 \times 10^7$ Pa, more preferably from $4 \times 10^6$ to $2.5 \times 10^7$ Pa and even more preferably from $8 \times 10^6$ to $2 \times 10^7$ Pa. Where a hydrocracking process is carried out at a low pressure of, for example $4 \times 10^6$ to $1.2 \times 10^7$ Pa, this may be termed 'mild hydrocracking'.

The hydrogen partial pressure (at the reactor inlet) is preferably in the range from $3 \times 10^6$ to $2.9 \times 10^7$ Pa, more preferably from $4 \times 10^6$ to $2.4 \times 10^7$ Pa and still more preferably from $8 \times 10^6$ to $1.9 \times 10^7$ Pa.

A space velocity in the range from 0.1 to 10 kg feedstock per liter catalyst per hour ($kg.l^{-1}.h^{-1}$) is conveniently used. Preferably the space velocity is in the range from 0.1 to 8, particularly from 0.2 to 5 $kg.l^{-1}.h^{-1}$.

The ratio of hydrogen gas to feedstock (total gas rate) used in the present process will generally be in the range from 100 to 5000 Nl/kg, but is preferably in the range from 200 to 3000 Nl/kg.

The present invention will now be illustrated by the following Examples.

EXAMPLES

Herein, unit cell size is determined by X-ray diffraction using ASTM D 3942-80; BET surface area is determined by the BET method of Brunauer, Emmett and Teller, J.Am. Chm. Soc., 60, 309 (1938), and ASTM D4365-95 using a single point assessment from nitrogen adsorption at a p/po value of 0.03; micropore volume is assessed by the t-plot method using nitrogen as adsorbate as described by Lippens, Linsen and de Boer, Journal of Catalysis, 3-32 (1964).

Catalyst Preparation

In the following examples the same VUSY is utilised in all of the catalysts of the invention and in reference catalysts C and F, and is a very ultrastable zeolite Y having a unit cell size of 24.32 Å, a molar silica to alumina ratio of 29, a BET surface area of 893 m²/g, and a micropore volume of 0.298 ml/g, prepared as described in WO 2004/047988.

Example 1

NiO/MoO$_3$/SiO$_2$/VUSY zeolite—13 wt %/25 wt %/9 wt %/53 wt %

557 g water were weighed into a 2 liter bulb. Subsequently, one after the other the following compounds were added: 54.4 g nickel carbonate (39.5 wt % nickel) and 62.1 g ammonium dimolybdate. 133.3 g zeolite were dispersed in 796 g water, added to the metals slurry and heated to 80° C. while stirring. Additionally another slurry of 22.5 g silica (Sipernat 50), 186 g water and 27.9 g ammonia 25 wt % solution was prepared.

As soon as the temperature of the zeolite-metal containing slurry reached 80° C., the silica-ammonia slurry was added and the mixture was heated to 80° C. The temperature was maintained at 80° C. for 45 minutes, during which time the pH of a sample, removed and cooled to room temperature, was measured as 7.4.

The resulting slurry was spray dried and yielded 190 g of powder. The powder was extruded, dried and calcined at 300° C. in air.

Example 2

NiO/WO$_3$/SiO$_2$/VUSY zeolite—9 wt %/28 wt %/9 wt %/54 wt %

In a 5 liter bulb, 238.6 g zeolite was dispersed in 3636 g water using an online disperser (Ultra-Turrax equipment as sold by Janke & Kunkel GmbH) for 1 minute. The resulting slurry was heated to 80° C. while stirring. Upon reaching this temperature, 78.5 g nickel carbonate (39 wt % nickel), 140.5 g ammonium metatungstate and 44.9 g Sipernat 50 were added to the water. Shortly thereafter, 57.5 g ammonia solution (with 25 wt % ammonia content) were mixed with the above slurry. The resulting mixture was kept at 80° C. for 30 minutes; the pH of the mixture was 8.3.

After 30 minutes the heating was switched off. 349.7 g of solid material was recovered by means of spray drying. The powder was extruded, and the obtained green extrudates were dried and then calcined at 300° C.

Example 3

NiO/MO$_3$/TiO$_2$/VUSY zeolite—13 wt %/24 wt %/9 wt %/54 wt %

In a 5 liter bulb, 298.3 g zeolite were dispersed in 4476 g water using an Ultra-Turrax online disperser for 1 minute. The resulting slurry was heated to 80° C. while stirring. Upon reaching this temperature, 137.7 g nickel carbonate (39.5 wt % nickel), 155.3 g ammonium dimolybdate and 51.5 g titanium dioxide P25 (ex Degussa) were added to the water. Shortly thereafter, 69.7 g ammonia solution (with 25 wt % ammonia content) were mixed with the above slurry. The resulting mixture was kept at 80° C. for 30 minutes; the pH of the mixture was 7.9.

After 30 minutes the heating was switched off. 489.6 g of solid material were recovered by spray drying. The powder was extruded, and the obtained green extrudates were dried and then calcined at 300° C.

Example 4

NiO/WO$_3$/TiO$_2$/VUSY zeolite—9 wt %/28 wt %/9 wt %/54 wt %

In a 5 liter bulb 298.3 g zeolite was dispersed in 4474 g water using an Ultra-Turrax online disperser for 1 minute. The resulting slurry was heated to 80° C. while stirring. Upon reaching this temperature, 98.2 g nickel carbonate (39.0 wt % nickel), 175.6 g ammonium metatungstate and 51.5 g titanium dioxide P25 (ex Degussa) were added to the water. Shortly thereafter, 71.9 g ammonia solution (with 25 wt % ammonia content) were mixed with the above slurry. The resulting mixture was kept at 80° C. for 30 minutes with a pH of 8.3.

After 30 minutes the heating was switched off. 465.8 g of solid material was recovered via spray drying. The powder was extruded, and the obtained green extrudates were dried and then calcined at 300° C.

Example 5

NiO/MoO$_3$/SiO$_2$/VUSY zeolite—7 wt %/14 wt %/6 wt %/73 wt %

557 g water were weighed into a 2 liter bulb. Subsequently, one after the other the following compounds were added: 55.1 g nickel carbonate (39 wt % nickel) and 62.1 g ammonium dimolybdate. 264.4 g zeolite were dispersed in 796 g water, added to the metals slurry and heated to 80° C. while stirring.

Additionally another slurry of 22.5 g silica Sipernat 50, 186 g water and 27.9 g ammonia 25 wt % solution was prepared.

As soon as the zeolite-metal containing slurry was at 80° C., the silica-ammonia slurry was added and the mixture was heated to 80° C. the temperature was maintained at 80° C. for 45 minutes, and the pH was 7.4. 1061 g of demineralised water heated to 80° C. was added and the mixture was homogenised.

The resulting slurry was spray dried and yielded 252 g of powder. The powder was extruded, dried and calcined at 300° C. in air.

Example 6

NiO/MoO$_3$/SiO$_2$/VUSY zeolite—5 wt %/19 wt %/6 wt %/70 wt %

In a 5 liter bulb 417.7 g zeolite was dispersed in 4419 g water using an Ultra-Turrax online disperser for 1 minute. The resulting slurry was heated to 80° C. while stirring. Upon reaching this temperature, 49.8 g nickel carbonate (39 wt % nickel), 112.4 g ammonium dimolybdate and 33.7 g Sipernat 50 silica were added to the water. Shortly thereafter, 26.6 g ammonia solution (with 25 wt % ammonia content) were mixed with the above slurry. The resulting mixture was kept at 80° C. for 30 minutes. The pH was 6.8.

After 30 minutes the heating was switched off. 509.4 g of solid material was recovered via spray drying. The powder was extruded, and the obtained green extrudates were dried and then calcined at 300° C.

Example 7

NiO/MoO$_3$/SiO$_2$/VUSY zeolite—20 wt %/20 wt %/10 wt %/50 wt %

In a 5 liter bulb 298 g zeolite was dispersed in 4444 g water using an Ultra-Turrax online disperser for 1 minute. The resulting slurry was heated to 80° C. while stirring. Upon reaching this temperature, 205.2 g nickel carbonate (39 wt % nickel), 115.8 g ammonium dimolybdate and 56.1 g Sipernat 50 silica were added to the water. Shortly thereafter, 101.1 g ammonia solution (with 25 wt % ammonia content) were mixed with the above slurry. The resulting mixture was kept at 80° C. for 30 minutes. The pH was 8.6.

After 30 minutes the heating was switched off. 522.5 g of solid material was recovered by spray drying. The powder was extruded, and the obtained green extrudates were dried and then calcined at 300° C.

Example 8

NiO/MoO$_3$/SiO$_2$/VUSY zeolite—14 wt %/26 wt %/10 wt %/50 wt %

In a 5 liter bulb, 298 g zeolite were dispersed in 4475 g water using an Ultra-Turrax online disperser for 1 minute. The resulting slurry was heated to 80° C. while stirring. Upon reaching this temperature, 137.7 g nickel carbonate (39 wt % nickel), 155.3 g ammonium dimolybdate and 56.1 g sipernat 50 silica were added to the water. Shortly thereafter, 69.7 g ammonia solution (with 25 wt % ammonia content) were mixed with the above slurry. The resulting mixture was kept at 80° C. for 30 minutes. The pH was 8.1.

After 30 minutes the heating was switched off. 487.7 g of solid material was recovered by spray drying. The powder was extruded, and the obtained green extrudates were dried and then calcined at 300° C.

Example 9

NiO/MoO$_3$/VUSY zeolite—17 wt %/33 wt %/50 wt %

In a 5 liter bulb, 298 g zeolite were dispersed in 4458 g water using an Ultra-Turrax online disperser for 1 minute. The resulting slurry was heated to 80° C. while stirring. Upon reaching this temperature, 172.1 g nickel carbonate (39 wt % nickel) and 194.2 g ammonium dimolybdate were added to the water. Shortly thereafter, 87.1 g ammonia solution (with 25 wt % ammonia content) were mixed with the above slurry. The resulting mixture was kept at 80° C. for 30 minutes. The pH was 8.1.

After 30 minutes the heating was switched off. 523.6 g of solid material was recovered by spray drying. The powder was extruded, and the obtained green extrudates were dried and then calcined at 300° C.

Example 10

NiO/MoO$_3$/VUSY zeolite—26 wt %/49 wt %/25 wt %

In a 5 liter bulb, 143.4 g zeolite were dispersed in 4413 g water using an Ultra-Turrax online disperser for 1 minute. The resulting slurry was heated to 80° C. while stirring. Upon reaching this temperature, 258.3 g nickel carbonate (39 wt % nickel) and 291.7 g ammonium dimolybdate were added to the water. Shortly thereafter, 129.5 g ammonia solution (with 25 wt % ammonia content) were mixed with the above slurry. The resulting mixture was kept at 80° C. for 30 minutes.

After 30 minutes the heating was switched off. 540 g of solid material was recovered by spray drying. The powder was extruded, and the obtained green extrudates were dried and then calcined at 300° C.

Example 11

NiO/MoO$_3$/VUSY zeolite/Beta zeolite—24 wt %/45 wt %/25 wt %/6 wt %.

The Beta zeolite used in this example had a silica to alumina ratio of approximately 300 and was obtained from Zeolyst International under product code CP-811C300.

In a 5 liter bulb, 143.0 g zeolite and 35.8 g Beta zeolite were dispersed in 4424 g water using an Ultra-Turrax online disperser for 1 minute. The resulting slurry was heated to 80° C. while stirring. Upon reaching this temperature, 237.8 g nickel carbonate (39 wt % nickel) and 268.5 g ammonium dimolybdate were added to the water. Shortly thereafter, 120.4 g ammonia solution (with 25 wt % ammonia content) were mixed with the above slurry. The resulting mixture was kept at 80° C. for 30 minutes.

After 30 minutes the heating was switched off. 508 g of solid material was recovered by spray drying. The powder was extruded, and the obtained green extrudates were dried and then calcined at 300° C.

Activity Testing

The hydrocracking performance of the catalysts of the invention was assessed in a number of second stage series-flow simulation tests against a number of reference catalysts. The testing was carried out in once-through microflow equipment which had been loaded with a top catalyst bed comprising 1 ml C-424 catalyst (commercially available from the Criterion Catalyst & Technology Company) diluted with 1 ml of 0.1 mm SiC particles and a bottom catalyst bed comprising 10 ml of the test catalyst diluted with 10 ml of 0.1 mm SiC particles. Both catalyst beds were pre-sulfided in situ prior to testing by one of two techniques:

Gas phase sulfidation: presulfiding is performed at 15 barg in gas phase (5 vol % H$_2$S in hydrogen), with a ramp of 20° C./h from room temperature (20° C.) to 135° C., and holding for 12 hours before raising the temperature to 280° C., and holding again for 12 hours before raising the temperature to 355° C. again at a rate of 20° C./h.

Liquid phase sulfidation: presulfiding is performed at 40 barg, using 1.5 vol % H$_2$S in hydrogen and a sulfur-containing gas oil, with a ramp of 20° C./h from room temperature (20° C.) to 135° C., and holding for 10 hours before raising the temperature to 280° C., and holding again for 10 hours before raising the temperature to 345° C. again at a rate of 20° C./h.

Each test involved the sequential contact of a hydrocarbonaceous feedstock (a heavy gas oil) with the top catalyst bed and then the bottom catalyst bed in a once-through operation under the following process conditions: a space velocity of 1.5 kg heavy gas oil per liter catalyst per hour (kg.l$^{-1}$.h$^{-1}$), a hydrogen gas/heavy gas oil ratio of 1440 Nl/kg, a hydrogen sulphide partial pressure of 5.6×10$^5$ Pa (5.6 bar) and a total pressure of 14×10$^6$ Pa (140 bar).

The Y zeolites used in reference catalysts A, B, D and E are commercially available from the PQ Corporation of Philadelphia, and have the properties given in Table 1.

By the following general procedure the reference catalysts were prepared using different amounts of zeolite and inorganic refractory oxide, generally alumina, in each catalyst formulation as noted in the Table below.

General Procedure:

A catalyst was prepared by mixing a zeolite with refractory inorganic oxide in the proportions required. Water and 3% wt nitric acid (65 wt % solution) were added in order to achieve a pH of in the range of from 4.4 to 5.7 and a loss on ignition of from 50 to 60 wt % and the mixture mulled in a mix-muller until an extrudable mix was obtained. The mixture was then extruded, together with an extrusion aid (Superfloc). The extrudates were dried statically for 2 hours at 120° C. and then calcined for 2 hours at 535° C. The catalyst particles so-obtained were of regular length.

The metal hydrogenation components of nickel and tungsten were then incorporated by impregnation of the pellets with an homogenized aqueous solution of nickel nitrate and ammonium metatungstate. The impregnated extrudates were dried at ambient conditions in hot circulating air for 1 hour and then at 120° C. for 2 hours and finally calcined at 500° C. for 2 hours.

TABLE 1

| Catalyst No. | wt % zeolite | Unit[1] cell size (Å) | Surface[1] area (m²/g) | SAR[1] | Micropore[1] volume (ml/g) | Metals Content (wt %) |
|---|---|---|---|---|---|---|
| Reference A | 50 | 24.30 | 724 | 9.3 | 0.25 | 4% Ni; 19% W |
| Reference B | 70 | 24.30 | 724 | 9.3 | 0.25 | 3.3% Ni; 16% W |
| Reference D[2] | 10 | 24.30 | 724 | 9.3 | 0.25 | 5% Ni; 21% W |
| Reference E | 50 | 24.52 | 817 | 5.3 | n.a. | 2.5% Ni; 9.8% Mo |

[1]properties of the zeolite
[2]support also contains amorphous silica alumina

Reference catalyst C is a catalyst wherein a metals plus silica binder composition has been prepared via the (co)precipitation route using component proportions to give comparable final component amounts to the compositions of Example 1. The oxide material formed was mixed and subsequently co-mulled with the same VUSY zeolite material as used in the catalyst preparation examples of the invention above. It was prepared as follows:

$NiO/MoO_3/SiO_2$/VUSY zeolite—13 wt %/26 wt %/10 wt %/50 wt %

220.5 g nickel carbonate (39.5 wt % nickel) and 256.1 g ammonium dimolybdate were mixed and added to 2250 g water in a 5 l autoclave, while stirring. The mixture was then heated to 80° C.

A second slurry of 92.2 g silica (Sipernat 50), 750 g water and 113 g ammonia 25 wt % solution was prepared. As soon as the metal-containing slurry reached 80° C., the silica-ammonia slurry was added and the mixture was kept at 80° C. for 30 minutes, while stirring.

The resulting slurry was spray dried, and the resulting powder was extruded with VUSY zeolite as a 50/50 mixture (on a dry weight basis), dried and calcined at 300° C. in air.

Reference catalysts A, B, D and E were gas phase sulfided in situ prior to testing at 15 barg in gas phase (5 vol% $H_2S$ in hydrogen), with a ramp of 40° C./h from room temperature (20° C.) to 200° C., and holding for 2 hours before raising the temperature to 280° C., and holding again for 2 hours before raising the temperature to 375° C. again at a rate of 40° C./h. Reference catalyst C was gas phase sulfided in situ as for the catalysts of the invention.

Example 12

In this Example the hydrocracking performance of the catalysts of Examples 1 to 5 was tested using a heavy gas oil used having the following properties:

| | |
|---|---|
| Carbon content | 86.47% w |
| Hydrogen content | 13.53% w |
| Nitrogen (N) content | 9 ppmw |
| Added n-Decylamine | 12.3 g/kg (equivalent to 1100 ppmw N) |
| Total nitrogen (N) content | 1109 ppmw |
| Density (15/4° C.) | 0.8736 g/ml |
| Density (70/4° C.) | 0.8394 g/ml |
| Molar weight | 433 g |
| Initial boiling point | 351° C. |
| 50% w boiling point | 451° C. |
| Final boiling point | 605° C. |
| Fraction boiling below 370° C. | 3.71% wt |
| Fraction boiling above 540° C. | 10.0% wt |

Hydrocracking performance was assessed at conversion levels between 40 and 90% wt net conversion of feed components boiling above 370° C. Table 2 shows the obtained results, expressed as the temperature required to obtain 65% wt net conversion of feed components boiling above 370° C.

The middle distillate (the product stream boiling from 150 to 370° C.) selectivity gain was assessed relative to reference catalysts A and B, and normalised to the same level of activity as the reference catalysts; thus the reference catalysts act as standards and therefore have an MD Selectivity gain of 0.0. Conversion of mono-aromatics and the hydrogen consumption are also recorded.

It can be clearly seen from Table 2 that the catalysts of the present invention are all significantly more active in mono-aromatics hydrogenation than all of the reference catalysts tested. The product selectivity to middle distillates is significantly better and the activity is increased (as shown by a reduced temperature requirement) in preferred catalysts wherein molybdenum is chosen as the Group VIII metal, and silica is the refractory oxide. It should be appreciated that a gain of 1% MD selectivity can provide 20,000 tonnes of additional MD yield in a world-scale commercial hydrocracking unit. Utilisation of the liquid phase sulfidation in preference to gas phase sulfidation provides an even further significantly improved MD selectivity and mono-aromatics hydrogenation. The hydrogen consumption of all catalysts of the invention is also greatly reduced compared with that of the reference catalysts.

Table 2 also demonstrates the possibility to tailor the catalyst composition to a specific purpose by selection of the refractory oxide utilised. Thus, where increased middle distillate selectivity is the aim of the hydrocracking process, then use of silica provides additional middle distillate selectivity gain (see catalysts 1, 2 and 2[1]). Where a high mono-aromatics conversion is the main aim, then selection of titania as refractory oxide is useful (see catalysts 3 and 4).

However, as is demonstrated in Example 13, combined high middle distillate selectivity and high mono-aromatics hydrogenation can be provided if the refractory oxide component is omitted altogether.

TABLE 2

| Catalyst | | T. req. (wt %) | C1-C4 (wt %) | C4 - 82 deg C. (wt %) | 82-150 deg C. (wt %) | 150-370 C. (wt %) | MD Selec. Gain (wt %)[2] | Mono-aromatics Conversion (wt %) | Hydrogen Consump (wt %) |
|---|---|---|---|---|---|---|---|---|---|
| A | | 379.8 | 3.5 | 11.6 | 22.1 | 62.8 | 0.0 | 38.8 | 1.38 |
| B | | 375.6 | 4.3 | 12.4 | 22.7 | 60.5 | 0.0 | 36.1 | 1.31 |
| C | NiMoSi | 375.1 | 3.7 | 11.7 | 22.3 | 62.3 | 2.0 | 52.9 | 1.19 |
| 1 | NiMoSi | 377.9 | 3.4 | 10.4 | 21.1 | 65.1 | 3.4 | 58.1 | 1.13 |
| 2 | NiWSi | 370.4 | 4.0 | 12.0 | 24.5 | 59.5 | 1.7 | 56.8 | 1.23 |
| 2[1] | NiWSi | 367.5 | 3.8 | 11.2 | 25.0 | 60.0 | 3.8 | 71.2 | 1.25 |
| 3 | NiMoTi | 374.1 | 4.0 | 11.1 | 23.8 | 61.1 | 1.3 | 62.2 | 1.22 |
| 4 | NiWTi | 373.9 | 3.8 | 12.0 | 26.5 | 57.7 | −1.9 | 63.4 | 1.22 |
| 5 | NiMoSi | 373.7 | 3.6 | 9.6 | 22.8 | 64.1 | 4.5 | 54.5 | 1.21 |

[1]sulfided by the liquid phase technique

[2]ain normalized to a linear interpolation or extrapolation of MD selectivities vs. required temperatures for reference catalysts A and B, which yields the relationship: Selectivity to 150-370° C. = 0.5310 × T req − 138.91

Example 13

In this Example, a hydrocracking performance assessment, was made of the catalysts described in Examples 6 to 11, against reference catalysts B and D. The activity testing was operated the same way as described above but this time using a slightly different heavy gas oil feed having the following properties:

| | |
|---|---|
| Carbon content | 86.50% w |
| Hydrogen content | 13.48% w |
| Nitrogen (N) content | 14 ppmw |
| Added n-Decylamine | 12.3 g/kg (equivalent to 1100 ppmw N) |
| Total nitrogen (N) content | 1114 ppmw |
| Density (15/4° C.) | 0.8757 g/ml |

-continued

| | |
|---|---|
| Density (70/4° C.) | 0.8415 g/ml |
| Molar weight | 433 g |
| Initial boiling point | 359° C. |
| 50% w boiling point | 451° C. |
| Final boiling point | 602° C. |
| Fraction boiling below 370° C. | 2.86% wt |
| Fraction boiling above 540° C. | 9.7% wt |

Reference catalysts B and D were sulfided by gas phase sulfidation as previously described, and the catalysts of Examples 6 to 11 by liquid phase sulfidation as previously described.

Table 3 below shows that, for catalysts containing nickel and molybdenum, middle distillate selectivity benefits can be further increased (to exceed 5% w on feed) by means of liquid phase sulfidation.

TABLE 3

| Catalyst | | T. req. (wt %) | C1-C4 (wt %) | C4 - 82 deg C. (wt %) | 82-150 deg C. (wt %) | 150-371 C. (wt %) | MD Selec. Gain (wt %)[2] | Mono-aromatics Conversion (wt %) | Hydrogen Consump (wt %) |
|---|---|---|---|---|---|---|---|---|---|
| B | | 375.7 | 4.4 | 14.6 | 24.0 | 57.1 | 0.0 | 39.7 | 1.08 |
| D | | 400.7 | 3.0 | 9.4 | 19.1 | 68.4 | 0.0 | 44.0 | 1.15 |
| 6[1] | NiMoSi | 375.4 | 4.0 | 11.6 | 22.2 | 62.2 | 5.3 | 57.5 | 1.13 |
| 7[1] | NiMoSi | 377.0 | 4.0 | 11.2 | 22.0 | 62.8 | 5.2 | 58.7 | 1.16 |
| 8[1] | NiMoSi | 376.6 | 3.4 | 10.9 | 22.5 | 63.1 | 5.6 | 61.7 | 1.15 |
| 9[1] | NiMo | 376.6 | 3.1 | 11.3 | 21.8 | 63.8 | 6.4 | 63.4 | 1.17 |
| 10[1] | NiMo | 378.3 | 4.0 | 11.4 | 21.2 | 63.5 | 5.3 | 67.7 | 1.17 |
| 11[1] | NiMo | 377.1 | 3.7 | 11.2 | 21.0 | 64.1 | 6.4 | 64.8 | 1.15 |

[1]sulphided by the liquid phase technique

[2]gain normalized to a linear interpolation or extrapolation of MD selectivities vs. required temperatures for reference catalysts B and D, which yields the relationship: Selectivity to 150-370° C. = 0.4549 × T req − 113.87

Example 14

In this Example the percentage of molybdenum contained within the pores of the VUSY zeolite was examined both for reference catalyst and for various of the catalysts of the invention.

Reference catalyst E is as previously described. Reference catalyst F is a catalyst of 3.6 wt % nickel and 10.85 wt % molybdenum impregnated onto a support containing 48 wt % of the zeolite utilised in the catalysts of the invention above with a combined alumina and amorphous silica alumina binder, the catalyst was prepared by the impregnation procedure used for the reference catalysts A, B, D and E. Both reference catalysts are gas phase sulfided in situ as described above for the reference catalysts. The catalysts of the invention are either gas phase or liquid phase sulfided as noted in Table 4 below.

To demonstrate the presence of molybdenum in the zeolite, a transmission electron microscope fitted with an X-ray energy-dispersive spectrometer is used for identifying and quantifying the elements present in the crystals of the zeolite. The catalyst tested in each case is fresh catalyst, i.e. catalyst in the oxidic form which has not yet been sulfided.

To do this, a JEOL JEM 2010 transmission electron microscope fitted with a Noran Instruments X-ray energy-dispersive spectrometer system, type Voyager 4.1, was employed. The catalyst extrudates were incorporated into resin in order to produce ultrafine sections 100 nm in thickness. The sections produced are held on a copper grid coated with a carbon membrane having holes, used for supporting the preparation. These preparations were dried under an IR lamp before being introduced into the transmission electron microscope, where they were subjected to a rough vacuum for a few minutes and then a high vacuum throughout the observation. The electron microscope was perfectly able to identify the zeolite crystals, with a size of about 0.4 microns, dispersed in the alumina matrix. Next, a number (10 to 15) of local analyses were carried out in various regions of the matrix and on various zeolite crystals with a probe being 0.1 microns in diameter. Quantitative processing of the signal was used to obtain the relative concentration of the elements (excluding oxygen) in wt %.

The hydrocracking performance was assessed in terms of MD selectivity gain either against the performance of reference catalysts A and B as described in Example 10, or that of reference catalysts B and D as in Example 11, and using the same heavy gas oil and same test conditions as noted in those examples.

It can be seen from the results in Table 4 that a significant percentage of molybdenum is able to impregnate the pores of the zeolite via conventional means. The preparation route of the present invention however enables a far higher amount of molybdenum to be located in the zeolite pores.

The MD selectivity gain for the catalysts of the present invention is significantly increased over that of reference catalyst F which utilises the same zeolite and conventional binder materials and is prepared via metals-impregnation.

TABLE 4

| Catalyst | | Al2O3 (wt %) | SiO2 (wt %) | Ni (wt %) | Mo in zeolite pores (wt %) | MD Selec. Gain (wt %) |
|---|---|---|---|---|---|---|
| E | | 20.5 | 75.7 | 2.5 | 1.3 | not tested |
| F | | 20.5 | 84.4 | 2.0 | 3.9 | 0.6[2] |
| 1 | NiMoSi | 3.1 | 89.4 | 1.9 | 5.6 | 3.4[2] |
| 8[1] | NiMoSi | 3.3 | 90.4 | 1.4 | 4.8 | 5.6[3] |
| 9[1] | NiMo | 5.7 | 84.0 | 2.0 | 8.4 | 6.4[3] |

[1] sulfided by the liquid phase technique
[2] gain normalized to a linear interpolation or extrapolation of MD selectivities vs. required temperatures for reference catalysts A and B, which yields the relationship: Selectivity to 150-370° C. = 0.5310 × T req − 138.91
[3] gain normalized to a linear interpolation or extrapolation of MD selectivities vs. required temperatures for reference catalysts B and D, which yields the relationship: Selectivity to 150-370° C. = 0.4549 × T req − 113.87

That which is claimed is:

1. An unsupported hydrocracking catalyst composition having improved mono-aromatics hydrogenation activity and selectivity for middle distillates, which comprises: a Group VIb metal and a non-noble Group VIII metal, wherein the total amount of said Group VIb metal and said non-noble Group VIII metal present in said unsupported catalyst composition is in the range of from 15 to 99 wt % on an oxide basis and based on the total unsupported catalyst composition, and wherein the molar ratio of said non-noble Group VIII metal to Group VIb metal is in the range of from 0.5:1 to 3:1, and a zeolite that is present in said unsupported catalyst composition ranging from 20 to 85 wt % based on the total unsupported catalyst composition, wherein said unsupported catalyst composition is prepared by the co-precipitation of said Group VIb metal, said non-noble Group VIII metal, and said zeolite at one and the same time, and wherein from 4 to 25 wt % of said Group VIb metal is incorporated into said pores of said co-precipitated zeolite, said unsupported hydrocracking catalyst composition having improved mono-aromatics hydrogenation activity and selectivity for middle distillates compared to hydrocracking catalyst compositions containing similar amounts of Group VIb metal, non-noble Group VIII metal, and zeolite, but not prepared by co-precipitation of all three of these components at one and the same time.

2. A catalyst composition as claimed in claim 1, wherein the zeolite is an ultrastable or very ultrastable zeolite Y present in an amount in the range of from 20 to 80 wt %, based on the total composition.

3. A catalyst composition as claimed in claim 2, further comprising:
a refractory oxide present in said unsupported catalyst composition in an amount in the range of from 0 to 40 wt %, basis total composition.

4. A catalyst composition as claimed in claim 3, wherein the refractory oxide is either silica or titania and is present in said unsupported catalyst composition in an amount in the range of from 5 to 40 wt %, basis total composition.

5. A catalyst composition as claimed in claim 4, wherein said non-noble Group VIII metal is nickel and said Group VIb metal is molybdenum, which are present in a molar ratio of nickel to molybdenum in the range of from 0.5:1 to 2.5:1.

6. A catalyst composition as claimed in claim 5, wherein the amount of molybdenum present in the zeolite pores is in the range of from 4, to 25 wt %, basis the composition in oxidic form.

7. A process for converting a hydrocarbonaceous feedstock into lower boiling materials, which comprises contacting the feedstock at elevated temperature in the presence of a catalyst composition as claimed in claim 1.

8. A process as claimed in claim 7, wherein the catalyst composition has been sulfided utilising a liquid phase sulfidation agent.

9. An unsupported hydrocracking catalyst composition as recited in claim 1, wherein:
said non-noble Group VIII metal is selected from the group consisting of nickel, cobalt and a combination thereof;
said Group VIB metal is selected from the group consisting of molybdenum, tungsten and a combination thereof; and
said zeolite is selected from the group consisting of zeolite Y, ZSM-5, ZSM-12, and zeolite beta.

10. The unsupported hydrocracking catalyst composition as recited in claim 9, wherein the total amount of Group VIII metal and Group VIB metal in said unsupported mixture is in the range of from 20 to 80 wt. %, on an oxide basis.

11. The unsupported hydrocracking catalyst composition as recited in claim 10, wherein the molar ratio of said non-noble Group VIII metal to said Group VIB metal is in the range of from 0.5:1 to 3:1.

12. The unsupported hydrocracking catalyst composition as recited in claim 11, wherein the content of said zeolite in said unsupported mixture is in the range of from 20 to 85 wt %.

13. The unsupported hydrocracking catalyst composition as recited in claim 12, wherein said unsupported mixture further comprises a refractory oxide material selected from the group consisting of silica, titania, amorphous silica-alumina, and alumina.

14. The unsupported hydrocracking catalyst composition as recited in claim 13, wherein said refractory oxide material is present in said unsupported mixture in an amount upwardly to 70 wt. %.

15. The unsupported hydrocracking catalyst composition as recited in claim 12, wherein said unsupported mixture has an absence of alumina.

16. The unsupported hydrocracking catalyst composition as recited in claim 12, wherein said unsupported mixture has a substantial absence of a refractory oxide material.

17. A hydrocracking process comprising:
contacting under suitable conversion reaction conditions a feedstock comprising hydrocarbons having a boiling point of at least 330° C. with the unsupported hydrocracking catalyst composition of claim 1 and providing a conversion product.

18. A method for the preparation of an unsupported hydrocracking catalyst composition having improved mono-aromatics hydrogenation activity and selectivity for middle distillates, wherein said method comprises: combining a Group VIb metal compound, a non-noble Group VIII metal compounds, and a zeolite, at one and the same time, in the presence of a protic liquid and an alkali compound to thereby provide a mixture; forming a precipitate; and recovering said precipitate that comprises said unsupported catalyst composition that comprises said Group VIb metal and said non-noble Group VIII metal that are present in a total amount in said unsupported catalyst composition in the range of from 15 to 99 wt %, on an oxide basis and based on the total unsupported catalyst composition and at a molar ratio of said non-noble Group VIII metal to said Group VIb metal in the range of from 0.5:1 to 3:1, and said zeolite that is present in the range of from 4 to 85 wt % based on said unsupported catalyst composition, and wherein from 4 to 25 wt % of said Group VIb metal is incorporated into said the pores of said precipitated zeolite, said unsupported hydrocracking catalyst composition having improved mono-aromatics hydrogenation activity and selectivity for middle distillates compared to hydrocracking catalyst compositions containing similar amounts of Group VIb metal, non-noble Group VIII metal and zeolite, but not prepared by coprecipitation of all three of these components at one and the same time.

19. A process as claimed in claim 18, wherein during precipitation the mixture of components has a pH of at least 6.0.

20. A process as claimed in claim 19, wherein at least one of the metals compounds is partly in the solid state and partly in dissolved state.

21. A process as claimed in claim 20, further comprising:
aging said mixture at a temperature in the range of from 20 to 95° C. for a minimum of 10 minutes prior to recovering said precipitate.

22. A process as claimed in claim 21, wherein said precipitate is recovered by spray drying.

23. A method as recited in claim 18, further comprising:
drying said recovered precipitate at a drying temperature in the range of from 20° C. to 200° C. to provide a dried precipitate.

24. A method as recited in claim 23, further comprising:
calcining said dried precipitate at a calcination temperature in the range of from 100 to 600° C.

25. A method as recited in claim 24, wherein said non-noble Group VIII metal is selected from the group consisting of nickel, cobalt and a combination thereof; said Group VIB metal is selected from the group consisting of molybdenum, tungsten and a combination thereof; and said zeolite is selected from the group consisting of zeolite Y, ZSM-5, ZSM-12, and zeolite beta.

26. An unsupported hydrocracking catalyst composition having improved mono-aromatics hydrogenation activity and selectivity for middle distillates, which comprises: 13 to 26 wt % nickel, 25 to 50 wt % molybdenum, and from 20 to 73 wt % zeolite VUSY, wherein the total amount of molybdenum and nickel present in said unsupported hydrocracking catalyst composition is in the range of from 20 to 80 wt % on an oxide basis and based on the total composition, wherein the molar ratio of nickel to molybdenum is in the range of from 0.5:1 to 2.0:1, based on the total composition, and wherein said unsupported catalyst composition is prepared by the coprecipitation of a nickel compound, a molybdenum compound and said zeolite VUSY, at one and the same time, under conditions that from 10 to 25 wt % of molybdenum is incorporated into the pores of said coprecipitated zeolite VUSY, said unsupported hydrocracking catalyst composition having improved mono-aromatics hydrogenation activity and selectivity for middle distillates compared to hydrocracking catalyst compositions containing similar amounts of nickel, molybdenum and zeolite VUSY, but not prepared by coprecipitation of all three of these components at one and the same time.

* * * * *